(12) United States Patent
Tomoi

(10) Patent No.: US 8,202,604 B2
(45) Date of Patent: Jun. 19, 2012

(54) PNEUMATIC TIRE AND METHOD OF PRODUCTION OF SAME

(75) Inventor: Shusaku Tomoi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 772 days.

(21) Appl. No.: 12/297,240

(22) PCT Filed: Apr. 26, 2007

(86) PCT No.: PCT/JP2007/059441
§ 371 (c)(1),
(2), (4) Date: Oct. 15, 2008

(87) PCT Pub. No.: WO2007/126143
PCT Pub. Date: Nov. 8, 2007

(65) Prior Publication Data
US 2009/0165914 A1    Jul. 2, 2009

(30) Foreign Application Priority Data
Apr. 28, 2006    (JP) .................................. 2006-125382

(51) Int. Cl.
*B60C 5/02*    (2006.01)
*B60C 5/12*    (2006.01)
*B60C 19/12*    (2006.01)
*B60C 23/00*    (2006.01)
*B29D 30/08*    (2006.01)
*B29D 30/00*    (2006.01)

(52) U.S. Cl. .......... 428/156; 428/78; 428/192; 152/510; 156/110.1; 156/123; 156/130; 156/394.1; 156/397

(58) Field of Classification Search .................... 428/57, 428/58, 60, 77, 78, 157, 159, 156, 192; 152/510
See application file for complete search history.

(56) References Cited

U.S. PATENT DOCUMENTS

| | | |
|---|---|---|
| 6,136,123 A | 10/2000 | Kaido et al. |
| 6,402,867 B1 | 6/2002 | Kaido et al. |
| 2002/0056496 A1 | 5/2002 | Tanaka et al. |
| 2004/0089388 A1 | 5/2004 | Fujino et al. |
| 2006/0182976 A1 | 8/2006 | Yamakawa et al. |

FOREIGN PATENT DOCUMENTS

| | | |
|---|---|---|
| EP | 0 774 340 | 5/1997 |
| EP | 0 854 054 | 7/1998 |
| EP | 1 186 401 | 3/2002 |
| EP | 1 419 903 | 5/2004 |
| JP | A 8-216610 | 8/1996 |
| JP | A 8-258506 | 10/1996 |
| JP | A 10-16509 | 1/1998 |
| JP | A 2000-26931 | 1/2000 |
| JP | A 2002-79590 | 3/2002 |
| JP | A 2004-176048 | 6/2004 |
| JP | A 2005-153536 | 6/2005 |
| WO | WO96/34736 A1 | 11/1996 |
| WO | WO 2005/063482 A1 | 7/2005 |

*Primary Examiner* — Catherine A Simone
(74) *Attorney, Agent, or Firm* — Greer, Burns & Crain, Ltd.

(57) ABSTRACT

A pneumatic tire having an air permeation preventive layer formed by adhering a resin film containing thermoplastic resin as a main component thereof to a tire inner wall surface, wherein the resin film is laminated, as a narrow width slit film shape, with an elastomer and the resultant ribbon-shaped laminate is continuously and spirally wound in a tire circumferential direction so that the edges thereof partially overlap to thereby form the air permeation preventive layer, whereby a pneumatic tire having a light weight and superior air permeation preventive property, no splice openings of the air permeation preventive layer at the time of tire processing, and capable of shortening the processing time can be obtained as well as the production method thereof.

10 Claims, 1 Drawing Sheet

PNEUMATIC TIRE AND METHOD OF PRODUCTION OF SAME

This application is a U.S. National Phase under 35 U.S.C. §371 of International Application No. PCT/JP2007/059441, filed Apr. 26, 2007.

TECHNICAL FIELD

The present invention relates to a pneumatic tire and a production method thereof, more specifically relates to a pneumatic tire having an air permeation preventive layer (or inner liner) formed from a resin film comprising a thermoplastic resin, as a main component thereof, which can prevent splice openings of the air permeation preventive layer (or peeling of spliced parts), is able to shorten a building time, is superior in air permeation preventive property and can be produced with little trouble even when building the tire using a complicated shape of building drum and a production method thereof.

BACKGROUND ART

In the past, to prevent air leakage and maintain the tire air pressure constant, the inside surface of the pneumatic tire has been provided with an air permeation preventive layer (or inner liner layer) comprised of a low gas permeability rubber such as a halogenated butyl rubber. In recent years, to further decrease the weight, it has been proposed to make the air permeation preventive layer from a low air permeability resin film (e.g., see Japanese Patent Publication (A) No. 8-216610, Japanese Patent Publication (A) No. 8-258506, Japanese Patent Publication (A) No. 2000-26931, etc.). When using a sheet-shaped resin film as an air permeation preventive layer, there is no tack like with rubber before vulcanization, and, therefore, when manufacturing the tire, the resin film is first laid on the inner surface of the carcass layer (or tire inner circumferential surface), the edges of the resin film are overlapped with each other and bonded to form a spliced part (i.e., overlapped part) extending in the tire width direction (i.e., first processing step), internal pressure is next applied thereto to lift the tire volume in the tire outside direction. Due to this lift, there is the problem that the resin film is stretched, and therefore, the spliced parts are open and so-called "splice openings" are formed to thereby decrease the air permeation preventive property of the tire after vulcanization. Further, when a seamless cylindrical resin film is used as the air permeation preventive layer, the problem of splice openings does not occur, but there was the problem that a step of insertion from the side of the tire processing drum becomes necessary, the operation work becomes troublesome and the tire processing time is increased. Furthermore, in recent years, there has been the tire processing method in which the tire processing drum is made a complicated shape and the shape of the green tire is approached to the vulcanized tire shape (e.g., see Japanese Patent Publication (A) No. 2005-153536). When this complicated shape processing drum (e.g., toroidal shape drum, rigid mandrel, flexible mandrel, etc.) is used, when a planarly sheet-shaped resin film is used as the air permeation preventive layer, the resin film cannot mold itself to the drum shape, the air permeation preventive layer is locally stretched, wrinkles are formed and other production defects were liable to occur.

DISCLOSURE OF THE INVENTION

Accordingly, an object of the present invention is to provide a pneumatic tire using a resin film, as an air permeation preventive layer, whereby the pneumatic tire having a light weight and superior air permeation preventive property, no splice openings of the resin film at the air permeation preventive layer at the time of tire production, the building time and building process can be shortened, and a resin film is used, as an air permeation preventive layer, even for a production method using a processing drum having a complicated shape and a production method thereof.

In accordance with the present invention, there is provided a pneumatic tire having an air permeation preventive layer formed by adhering a resin film comprising, as a main component, a thermoplastic resin to a tire inner wall surface, wherein the resin film is laminated, as a narrow width slit film shape, with an elastomer and the resultant ribbon-shaped laminate is continuously and spirally wound in a tire circumferential direction so that the edges thereof partially overlap to thereby form the air permeation preventive layer.

In accordance with the present invention, there is further provided a production method of a pneumatic tire comprising;

making a resin film containing a thermoplastic resin, as a main component, into a narrow width slit shaped film, laminating an elastomer with the resultant film to obtain a ribbon-shaped laminate, winding the resultant laminate continuously in a spiral shape at an outer circumferential surface of a tire processing drum so that the edges thereof partially overlap so as to form an air permeation preventive layer, placing other tire component members on the air permeation preventive layer to form a green tire, then vulcanizing the resultant green tire.

According to the present invention, by making a resin film comprising, as a main component, a thermoplastic resin into a narrow width slit film, laminating an elastomer with the resultant slit film to obtain a ribbon-shaped laminate, and winding the laminate continuously and spirally at the tire circumferential direction so that the edges thereof partially overlap so as to form an air permeation preventive layer of a pneumatic tire, it is possible to obtain a light weight and superior air permeation preventive property and to shorten the processing time, without causing splice openings at the air permeation preventive layer, at the time of processing.

BEST MODE FOR CARRYING OUT THE INVENTION

Figure 1:
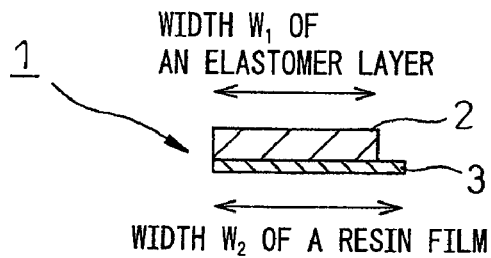
FIG. 1 is a cross-sectional view in the width direction of a ribbon-shaped laminate of the present invention.

The inventors engaged in research to solve the above problems and, as a result, succeeded in achieving the object by forming an air permeation preventive layer of a tire inner wall surface by making a resin film containing a thermoplastic resin, as a main component, a narrow width slit film, laminating an elastomer layer with the resultant film, and winding the resultant ribbon-shaped laminate continuously and spirally in the tire circumferential direction while making the edges thereof partially overlap.

In this way, in the present invention, since a strip-shaped film having a thermoplastic resin, as a main component, is used, compared with the past case of using, for example, a halogenated butyl rubber, the air permeation coefficient becomes small, and, therefore, the air permeation preventive layer can be made thinner and, therefore, the tire weight can be degreased. Further, since the strip-shaped film is wound in a spiral shape at the tire inner circumferential surface to form an air permeation preventive layer, no spliced parts are formed extending in the tire width direction like in the past, and, therefore, the problem of occurrence of splice openings also does not occur.

Furthermore, the method for inserting a cylindrical film from the side of a tire processing drum is also known, but compared with this, according to the present invention, a strip-shaped film is wound in a spiral shape at the tire inner circumferential surface to quickly form an air permeation preventive layer, and, therefore, the tire processing time can be decreased. That is, the production method of the pneumatic tire of the present invention enables production of a pneumatic tire by continuously winding a ribbon-shaped laminate of a resin film containing a thermoplastic resin, as a main component, and an elastomer in a spiral shape on the outer circumferential surface of a tire building drum, while making the edges thereof partially overlap so as to form an air permeation preventive layer, arranging other tire component members on the air permeation preventive layer to form a green tire, then vulcanizing the resultant green tire.

In this way, according to the present invention, it is sufficient to continuously wind a ribbon-shaped laminate comprised of a laminate of a resin film containing a thermoplastic resin, as a main component, and an elastomer in a spiral shape on the outer circumferential surface of a tire processing drum, and, therefore, a pneumatic tire can be easily produced. Furthermore, when tires of different sizes are produced, in the past it was necessary to prepare air permeation preventive layer members tailored to those dimensions (widths), but in the present invention, a fine width ribbon-shaped laminate is wound in a spiral shape to form an air permeation preventive layer, and, therefore, a single type of member can be used to handle various sizes of tires, and, therefore, the productivity is improved. Further, even for a method for processing a green tire using a complicated shape of processing drum, by winding the ribbon-shaped laminate over the complicated shape of the processing drum to form an air permeation preventive layer, the air permeation preventive layer can be molded against the drum of the complicated shape, and, therefore, the green tire can be shaped, without the air permeation preventive layer being locally stretched or wrinkled.

The pneumatic tire of the present invention is comprised of a tire at the inner circumferential surface of which a ribbon-shaped narrow width laminate of a laminate of a resin film containing a thermoplastic resin, as a main component, and an elastomer is continuously wound in a spiral shape to form an air permeation preventive layer substantially covering the inside surface of the tire. The air permeation preventive layer need not be made the innermost surface of the tire. Further, a multilayer structure may also be used.

To produce the pneumatic tire of the present invention, first a ribbon-shaped laminate is wound in a spiral shape around the outer circumferential surface of a tire processing drum so as to substantially cover the entire surface of the processing drum. In this case, the amount of offset of the starting end of winding of the ribbon and the ending end of winding in one turn may be made zero. The resin film forming the ribbon-shaped laminate preferably has a thickness of 0.0001 to 1.1 mm, more preferably 0.001 to 0.5 mm. If this thickness is too thin, the processability is decreased. Furthermore, the effect as an air permeation preventive layer is liable not to be exhibited in some cases, and, therefore, this is not preferred. Conversely, if too thick, the tire weight will increase. This is not preferable in terms of lightening the weight. Furthermore, the durability is liable to be decreased. The resin film has a width W of preferably in the range of 5 to 100 mm, more preferably 10 to 50 mm. If narrower, the number of winding turns increases, and, therefore, the processability is decreased, while conversely is too broad, the waste amount of the material at the start and end of the wound ribbon would become larger, and, therefore, this is not practically preferable.

The elastomer layer forming the ribbon-shaped laminate has a thickness of preferably in the range of 0.01 to 5 mm, more preferably 0.1 to 2 mm. If this thickness is thin, the role as a reinforcing layer in the case of the thin resin film cannot be achieved. Further, the role as a guide in the case of overlapping the ends cannot be achieved. The processability is liable to be decreased. Conversely, if too thick, the handling capability of the ribbon in the winding step around the processing drum is liable to become poor.

Figure 2:
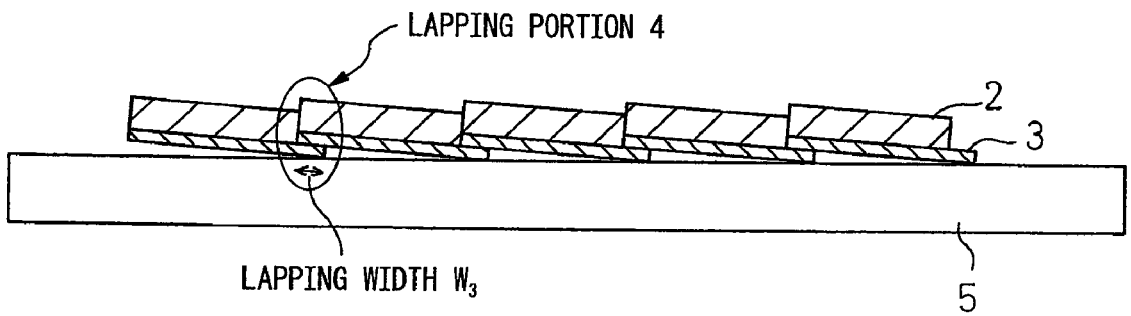
FIG. 2 is a view schematically showing the state of winding the ribbon-shaped laminate of the present invention on the surface of a processing drum, while overlapping.
Figure 3:
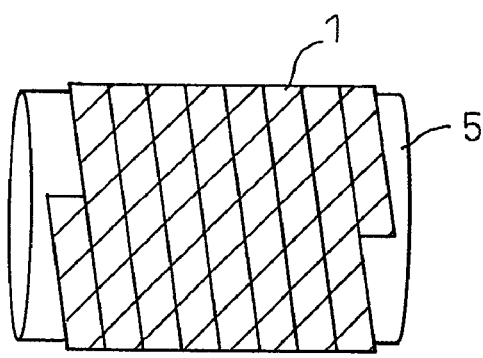
FIG. 3 is a view schematically showing the overlapped state of a ribbon-shaped laminate on a processing drum according to the present invention.

As schematically shown in FIG. 1 and FIG. 2, the width $W_1$ of the elastomer layer 2 forming the ribbon-shaped laminate 1 is preferably, based on the resin film width $W_2$, 0.5 $W_2$ to less than 1 $W_2$, more preferably 0.6 $W_2$ to 0.8 $W_2$. This is because if there is an elastomer layer 2 between the overlapped parts of the resin film layer 3, the effect as an air permeation preventive layer is decreased. Furthermore, the elastomer layer 2 is preferably laid aligned with the end of the resin film 3 at the side at the overlapped part 4, where the ribbon-shaped laminate is laid at the top.

When the ribbon-shaped laminate is wound in a spiral shape, as shown in FIG. 2, the edges of the ribbon-shaped laminate should be made to overlap. The overlapped width $W_3$ is not particularly limited so long as the inner surface of the tire is substantially covered by the air permeation preventive layer, but it is, based on the film width $W_2$, 0 $W_2$ to 0.5 $W_2$, preferably 0.05 $W_2$ to 0.5 $W_2$. More preferably, it is 0.2 $W_2$ to 0.4 $W_2$. If the overlapped width $W_3$ is zero, there will no longer be any overlapped parts 4 and openings between the ribbons, discontinuities in the air permeation preventive layer, etc. will occur, and, therefore, this is not preferred. If the overlapped width is small, the overlapped width $W_3$ will be too narrow and openings will tend to form between the ribbon-shaped films at the locations of the overlapped parts 4 at the time of the second processing, while conversely is too broad, the waste amount of the film material will become greater. This would be uneconomical, and, therefore, is not preferred.

As explained above, when the ribbon-shaped laminate is overlapped, it is sufficient to provide a tackifier layer (not shown) on the resin film 3. Due to this, it is possible to improve the contact before vulcanization with the elastomer and the adhesion after vulcanization with the elastomer layer 2 laminated on top of the resin film 3. Further, at the location of the overlapped part 4, it is possible to further decrease the openings between the ribbon-shaped laminate 1 at the overlapped part at the time of second processing, whereby the air permeation preventive property is further improved. As the material of the tackifier layer used at this time, an adhesive giving an adhesive performance due to the heat and pressure at the time of vulcanization molding, for example, a composition of a rubber (e.g., natural rubber, styrene-butadiene copolymer rubber, isobutylene-isoprene copolymer rubber, polybutadiene rubber, polyisobutylene, polyisoprene, styrene-butadiene-styrene block copolymer, styrene-isoprene-styrene block copolymer and their epoxy-modified products and maleic acid-modified products) into which a filler (e.g., carbon black, calcium carbonate, silica), an adhesive resin (e.g., resorcine formaldehyde resin), tackifier (e.g., terpene resin, terpene phenol resin, modified terpene resin, hydrated terpene resin, rosin ester, alicyclic saturated hydrocarbon resin), etc. have been compounded and, furthermore, into which a vulcanizing agent, vulcanization accelerator, oil, antioxidant, plasticizer, etc. have been suitably compounded or a phenol resin-based (e.g., Chemlock 220), chlorinated rubber-based (e.g., Chemlock 205), or isocyanate-based (e.g., Chemlock 402) adhesive etc. may be mentioned.

The means for winding the ribbon-shaped laminate in a spiral shape around the outer circumferential surface of the processing drum 5 is not particularly limited. For example, the ribbon-shaped laminate may be wound from the left end toward the right end of the processing drum or the ribbon-shaped laminate may be wound from the right end toward the left end. Further, the ribbon-shaped laminate may be wound from the right end and left end of the processing drum to the center or the ribbon-shaped laminate may be wound from the center of the processing drum to the right end and left end. There are various means such as winding from the right end to the center and from center to the left and or from the left end to the center and from the center to the right end. After winding the ribbon-shaped laminate in the processing drum in a spiral shape in this way, the usual method is followed to lay the other tire component members on the top to form a green tire, then this green tire is vulcanized to obtain a pneumatic tire.

The thermoplastic resin forming the ribbon-shaped laminate usable in the present invention is those having an air permeation coefficient of preferably $25 \times 10^{-12}$ cc·cm/cm$^2$·sec·cmHg or less, more preferably $5 \times 10^{-12}$ cc·cm/cm$^2$·sec·cmHg or less, and a Young's modulus of preferably 1 to 500 MPa, more preferably 10 to 300 MPa. If the air permeation coefficient is large, the air permeation preventive layer for holding the tire air pressure must be made thicker—which runs against the object of decreasing the weight of the tire. Further, if the Young's modulus of the film is small, wrinkles etc. occur at the time of processing the tire and the processability is decreased, while conversely if large, problems are liable to occur in terms of durability.

As the thermoplastic resin explained above, for example, polyamide-based resins (e.g., Nylon 6 (N6), Nylon 66 (N66), Nylon 46 (N46), Nylon 11 (N11), Nylon 12 (N12), Nylon 610 (N610), Nylon 612 (N612), Nylon 6/66 copolymer (N6/66), Nylon Jun. 66, 19610 copolymer (N6/66/610), Nylon MXD6 (MXD6), Nylon 6T, Nylon 6/6T copolymer, Nylon 66/PP copolymer, Nylon 66/PPS copolymer and their N-alkoxylates), polyester-based resins (e.g., polybutylene terephthalate (PBT), polyethylene terephthalate (PET), polyethylene isophthalate (PE10), PET/PEI copolymer, polyarylate (PAR), polybutylene naphthalate (PBN), liquid crystal polyester, polyoxyalkylene diimidic acid/polybutylate terephthalate copolymer, and other aromatic polyesters), polynitrile-based resins (e.g., polyacrylonitrile (PAN), polymethacrylonitrile, acrylonitrile/styrene copolymer (AS), methacrylonitrile/styrene copolymer, methacrylonitrile/styrene/butadiene copolymer), polymethacrylate-based resin (e.g., polymethyl methacrylate (PMMA) and polyethyl methacrylate), polyvinyl acetate-based resins (e.g., polyvinyl acetate (PVA), ethylene/vinyl acetate copolymer (EVA)), polyvinyl alcohol-based resin (e.g., polyvinyl alcohol (PVOH), vinyl alcohol/ethylene copolymer (EVOH)), polyvinyl chloride-based resin (e.g., polyvinylidene chloride (PVDC), polyvinyl chloride (PVC), vinyl chloride/vinylidene chloride copolymer, vinylidene chloride/methyl acrylate copolymer, vinylidene chloride/ acrylonitrile copolymer), cellulose-based resins (e.g., cellulose acetate and cellulose acetobutyrate), fluorine-based resins (e.g., polyvinylidene fluoride (PVDF), polyvinyl fluoride (PVF), polychlorofluoroethylene (PCTFE), tetrafluoroethylene/ethylene copolymer), imide-based resins (e.g., aromatic polyimides (PI)), etc. may be mentioned. These may be used alone or in any blends thereof.

As the thermoplastic resin film usable in the present invention, a film of a thermoplastic elastomer comprised of the above thermoplastic resin, into which an elastomer is compounded may be used. As the elastomer component capable of compounding with the thermoplastic resin, those forming a composition in a state compounded with the thermoplastic resin ingredient and, as a result, having the above air permeation coefficient and Young's modulus is preferable. As such an elastomer, for example, the following may be mentioned. The amounts are not particularly limited.

Diene-based rubbers and their hydrogenates (e.g., natural rubber (NR), polyisoprene rubber (IR), epoxylated natural rubber, styrene-butadiene copolymer rubber (SBR), polybutadiene rubber (BR) (high cis BR and low cis BR), acrylonitrile-butadiene rubber (NBR), hydrogenated NBR, and hydrogenated SBR), olefin-based rubbers (e.g., ethylene propylene rubber (EPDM, EPM), maleic acid-modified ethylene propylene rubber (M-EPM), butyl rubber (IIR), isobutylene and aromatic vinyl or diene-based monomer copolymers), acryl rubber (ACM), ionomer, halogen-containing rubber (e.g., Br-IIR, CI-IIR, brominated isobutylene-p-methylstyrene copolymer (Br-IPMS), chloroprene rubber (CR), hydrin rubber (CHR.CHC), chlorosulfonated polyethylene (CSM), chlorinated polyethylene (CM), maleic acid-modified chlorinated polyethylene (M-CM)), silicone rubber (for example methylvinyl silicone rubber, dimethyl silicone rubber, methylphenylvinyl silicone rubber), sulfur-containing rubber (e.g., polysulfide rubber), fluorine rubber (e.g., vinylidene fluoride-based rubber, fluorine-containing vinyl ether-based rubber, tetrafluoroethylene-propylene-based rubber, fluorine-containing silicone-based rubber, fluorine-containing phosphagen-based rubber), thermoplastic elastomers (e.g., styrene-based elastomers, olefin-based elastomers, ester-based elastomers, urethane-based elastomers, polyamide-based elastomers), etc. may be mentioned. These may be used alone or in any blends thereof.

The production method of a thermoplastic elastomer composition film comprised of a blend of a thermoplastic resin and elastomer in the present invention comprises melt mixing in advance, the thermoplastic resin component and the elastomer component (in the case of rubber, unvulcanized) by a twin-screw kneader etc. to make the elastomer component disperse in the thermoplastic resin forming the continuous phase. When the elastomer ingredient is vulcanized, the vulcanizing agent may be added, while mixing to dynamically vulcanize the elastomer component. Further, the various compounding agents to be added to the thermoplastic resin or elastomer component (except the vulcanizing agent) may be added during the above mixing, but are preferably mixed, in advance, before the mixing. The mixing machine used for mixing the thermoplastic resin and elastomer components is not particularly limited. A screw kneader, kneader, Banbury mixer, twin-screw kneader, etc. may be mentioned. Among these, for mixing a thermoplastic resin and elastomer component and for dynamic vulcanization of the elastomer component, a twin-screw kneader is preferably used. Furthermore, two or more types of kneading machines may be used for successive mixing. As the melt kneading conditions, the temperature should be the temperature, at which the thermoplastic resin melts or higher. Further, the shear speed at the time of mixing is preferably 1000 to 7500 sec$^{-1}$. The time of the mixing, as a whole, is from 30 seconds to 10 minutes. Further, when adding a vulcanizing agent, the vulcanization time after the addition thereof is preferably 15 seconds to 5 minutes. The thermoplastic elastomer composition formed by the above method is next extruded or calendared to form a film. The method of film formation may be the method of forming an ordinary thermoplastic resin or thermoplastic elastomer into a film.

The film thus obtained is structured, as a matrix of the thermoplastic resin (A), in which the elastomer component (B) is dispersed, as a discontinuous phase. By employing such a state of dispersed structure, it becomes possible to impart a balance of flexibility and air permeation resistance, possible to obtain an improvement in the heat deformation resistance and other effects, etc., and possible to perform thermoplastic working, and, therefore, an ordinary resin molding machine, that is, extrusion or calendaring, may be used to form the film. The film formation method may be the method for forming an ordinary thermoplastic resin or thermoplastic elastomer into a film.

When the above specific thermoplastic resin and elastomer components are different in the solubility, a suitable compatibilizing agent is preferably added as a third component. By incorporating a compatibilizing agent into the system, the interfacial tension between the thermoplastic resin and elastomer components is decreased and, as a result, the particles of rubber forming the dispersed layer become finer, and, therefore, the properties of the two components are more effectively expressed. As such a compatibilizing agent, generally, a copolymer having the structure of both or one of the thermoplastic resin and elastomer component or one having a copolymerizable structure having an epoxy group, carbonyl group, halogen group, amino group, oxazoline group, hydroxyl group, etc. able to react with the thermoplastic resin or elastomer ingredient may be used. These may be selected, depending upon the types of the thermoplastic resin and elastomer component mixed, but those usually used are a styrene/ethylene butylene block copolymer (SEBS) and the maleic acid-modified product thereof, EPDM:EPDM/styrene or EPDM/acrylonitrile graft copolymer and the maleic acid-modified product thereof, a styrene/maleic acid copolymer, reactive phenoxin, etc. The amount of the compatibilizing agent is not particularly limited, but 0.5 to 10 parts by weight, based upon 100 parts by weight of the polymer component (the total of thermoplastic resin and elastomer components) is preferable.

The composition ratio of the specific thermoplastic resin (A) and the elastomer component (B), when a thermoplastic resin and an elastomer are compounded, is not particularly limited and may be suitably determined by the balance of the film thickness, air permeation resistance and flexibility, but the preferable range is a weight ratio (A)/(B) of 10/90 to 90/10, more preferably 15/85 to 90/10.

The thermoplastic elastomer composition according to the present invention may contain therein, in addition to the above essential polymer components, another polymer to a range not impairing the required properties of the thermoplastic elastomer composition for tire of the present invention. The object of compounding the other polymers may be to improve the film formability of the material, to improve the heat resistance, to decrease the costs, etc. As the material usable for this purpose, for example, a polyethylene (PE), polypropylene (PP), polystyrene (PS), ABS, SBS, polycarbonate (PC), etc. may be mentioned. Further, a polyethylene, polypropylene, or other olefin copolymer or the maleic acid-modified product thereof or a glycidyl group-introduced derivatives thereof, etc. may also be mentioned. The polymer composition according to the present invention may further contain a filler generally compounded into polymer formulations, carbon black, quartz powder, calcium carbonate, alumina, methane oxide, etc. so long as not impairing the requirements of the air permeation coefficient and Young's modulus.

The vulcanizing agent, vulcanization aid, vulcanization conditions (e.g., temperature and time), etc. in the case of dynamic vulcanization may be suitably determined depending upon the composition of the elastomer component added and are not particularly limited. As the vulcanizing agent, a general rubber vulcanizing agent (or cross-linking agent) may be used. Specifically, as a sulfur-based vulcanizing agent, sulfur powder, precipitated sulfur, high dispersion sulfur, surface treated sulfur, insoluble sulfur, dimorpholine disulfide, alkyl phenol disulfide, etc. may be mentioned. For example, 0.5 to 4 phr (i.e., parts by weight per 100 parts by weight of rubber component (polymer)) or so may be used.

As the organic peroxide-based vulcanizing agent, benzoyl peroxide, t-butyl hydroperoxide, 2,4-dichlorobenzoyl peroxide, 2,5-dimethyl-2,5-di(t-butylperoxy)hexane, 2,5-dimethylhexane-2,5-di(peroxylbenzoate), etc. may be mentioned. For example, 1 to 15 phr or so may be used.

Furthermore, as the phenol resin-based vulcanizing agent, a bromide of an alkyl phenol resin, a mixed cross-linking system of stannous chloride, chloroprene, or another halogen donor and an alkyl phenol resin, etc. may be mentioned. For example, 1 to 20 phr or so may be used. In addition, zinc white (5 phr or so), magnesium oxide (4 phr or so), litharge (10 to 20 phr or so), p-quinone dioxime, p-dibenzoyl quinine dioxime, tetrachloro-p-benzoquinone, poly-p-dinitrosobenzene (2 to 10 phr or so), and methyl dianiline (0.2 to 10 phr or so) may be mentioned.

If necessary, a vulcanization accelerator may also be added. As the vulcanization accelerator, an aldehyde-ammonia-based, guanidine-based, thiazole-based, sulfenamide-based, thiuram-based, dithio acid salt-based, thiourea-based, or other general vulcanization accelerator in an amount of, for example, 0.5 to 2 phr or so may be used. Specifically, as an aldehyde-ammonia-based vulcanization accelerator, hexamethylene tetramine etc.; as a guanidine-based vulcanization accelerator, diphenyl guanidine etc.; as a thiazole-based vulcanization accelerator, dibenzothiazyl disulfide (DM), 2-mercaptobenzothiazole and its Zn salt, cyclohexylamine salt, etc.; as a sulfenamide-based vulcanization accelerator, cyclohexyl benzothiazyl sulfenamide (CBS), N-oxydiethylene benzothiazyl-2-sulfenamide, N-t-butyl-2-benzothiazole sulfenamide, 2-(thymolpolynyldithio)benzothiazole, etc.; as a thiuram-based vulcanization accelerator, tetramethyl thiuram disulfide (TMTD), tetraethyl thiuram disulfide, tetramethyl thiuram monosulfide (TMTM), dipentamethylene thiuram tetrasulfide, etc.; as a dithio acid salt-based vulcanization accelerator, Zn-dimethyl dithiocarbamate, Zn-diethyl dithiocarbamate, Zn-di-n-butyl dithiocarbamate, Zn-ethyphenyl dithiocarbamate, Te-diethyl dithiocarbamate, Cu-dimethyl dithiocarbamate, Fe-dimethyl dithiocarbamate, pipecoline pipecoryl dithiocarbamate, etc.; and as a thiourea-based vulcanization accelerator, ethylene thiourea, diethyl thiourea, etc. are disclosed.

As vulcanization accelerators, general rubber adjuvants may be used. For example, zinc white (5 phr or so), stearic acid, oleic acid and Zn salts thereof (2 to 4 phr or so) etc. may be used.

The elastomer component for forming the elastomer layer of the ribbon-shaped laminate according to the present invention is not particularly limited so long as a diene-based rubber, olefin-based rubber or thermoplastic elastomer. Specifically, as diene-based rubbers, there are, for example, NR, IR, SBR, BR, NBR, CR, etc. As olefin-based rubbers, for example, there are EPM, EPDM, IIR, halogenated IIR, isobutylene p-methylstyrene copolymer (IPMS) and its bromide (Br-IPMS), etc. As thermoplastic elastomers, there are, for example, styrene-based elastomers, olefin-based elastomers, ester-based elastomers, urethane-based elastomers, polyamide-based elastomers, etc. Their epoxylates or maleates may also be used.

The elastomer components for forming the elastomer layer may contain carbon black, silica, or another filler, a vulcanization or cross-linking agent, a vulcanization or cross-linking accelerator, various types of oil, an antioxidant, a plasticizer, or other various types of additives generally compounded into and rubber compositions for tire and other rubber uses. These additives may be compounded to form a composition for use for vulcanization or cross-linking by a general method. The amounts of these additives may be made the conventional general amounts so long as not adversely affecting the object of the present invention.

EXAMPLES

Examples will now be used to further explain the present invention, but the scope of the present invention is not limited to these examples of course.

In the following Examples, thermoplastic elastomer compositions were mixed using a twin screw kneader and extruded from a T-die in a two-layer shape to prepare a sheet-shaped air permeation preventive layer comprising the two layers of a thermoplastic elastomer composition and an adhesive composition layer. This air permeation preventive layer is cut into a slit shape and this slit-shaped film is laminated onto a strip-shaped rubber compound to form a ribbon-shaped laminate. This is wound in a spiral shape around the outer circumferential surface of the tire processing drum. According to ordinary methods, other tire component members are additionally laminated thereon to shape a green tire. This green tire is then vulcanized to fabricate a tire size: 165SR13 (rim size: 13×41/2−J) pneumatic tire. Each tire thus obtained was evaluated by the following methods for processing time, splice openings and air leakage tests (rate of decrease in the pressure).

Preparation of Thermoplastic Elastomer Composition

In each formulation ratio (parts by weight) shown in Table I, a resin, rubber material and cross-linking system compounding agents necessary for dynamic cross-linking were mixed by a twin screw kneader to obtain a state of a thermoplastic resin forming a continuous phase, in which rubber is finely dispersed. This was then extruded in strands from the discharge outlet of the twin screw kneader. The strands were cut by a cutter into pellets to prepare pellets of the thermoplastic elastomer composition.

TABLE I

| Formulation ingredient | Formulation 1 (parts by weight) |
| --- | --- |
| Nylon 11*1 | 24 |
| Nylon 6.66*2 | 16 |
| BIMS*3 | 60 |

TABLE I-continued

| Formulation ingredient | Formulation 1 (parts by weight) |
| --- | --- |
| Zinc white*4 | 0.3 |
| Stearic acid*5 | 1.2 |
| Stearic acid zinc*6 | 0.6 |

*1BESN O TL made by Arkema
*25033B made by Ube Industries
*3Exxpro MDX89-4 made by Exxon Mobil Chemical
*4Zinc White #3 made by made by Seido Chemical Industry
*5Beads Stearic Acid made by NOF
*6Zinc Stearate made by Seido Chemical Industry Preparation of Tackifier Composition To attach the thermoplastic elastomer composition to the tire inner surface and insides, by each formulation ratio (parts by weight) shown in Table II, a twin screw kneader was used to sufficiently mix a heat cross-linking polymer, tackifier and other compounding agents. The resultant mixture was then extruded in strands from the discharge outlet. The strands were water-cooled, then cut into pellets by a cutter to prepare pellets of the tackifier composition.

TABLE II

| Formulation ingredients | Formulation 2 (parts by weight) |
| --- | --- |
| Epoxy modified SBS*1 | 50 |
| SBS*2 | 50 |
| Tackifier*3 | 100 |
| Zinc white*4 | 3 |
| Stearic acid*5 | 1 |
| Peroxide*6 | 1 |

*1Epofriend A1020 made by Daicel Chemical Industries
*2Tufprene 315 made by Asahi Kasei
*3Pensel AD made by Arakawa Chemical Industries
*4Zinc White #3 made by Seido Chemical Industry
*5Beads Stearic Acid made by NOF
*6Perkadox 14 made by Kayaku Akzo Preparation of Air Permeation Preventive Layer Examples 1 and 2

Pellets of the thermoplastic elastomer composition shown in Table I and the tackifier composition were used and a general-use two-layer T-die extrusion machine was used to form a laminate film and a laminate film of the thermoplastic elastomer composition and tackifier composition was obtained. The thickness of the thermoplastic elastomer composition was 200 μm and the thickness of the tackifier composition was 50 μm. This was cut into a width of 50 mm. On the top of the tackifier layer of this film, a rubber compound having a thickness of 1 mm and a width of 40 mm was laminated aligned with one end of the film to obtain a ribbon-shaped laminate. The formulation of the rubber compound was as shown in Table III.

TABLE III

| Formulation ingredients | Formulation (parts by weight) |
| --- | --- |
| Natural rubber*1 | 50 |
| SBR*2 | 50 |
| Carbon black*3 | 50 |
| Zinc white*4 | 3 |
| Stearic acid*5 | 2 |
| Oil*6 | 10 |

TABLE III-continued

| Formulation ingredients | Formulation (parts by weight) |
|---|---|
| Wax*[7] | 1 |
| Sulfur*[8] | 2 |
| Vulcanization accelerator*[9] | 1 |
| Antioxidant*[10] | 1 |

*[1]Natural rubber TSR20 made by NUSIRA
*[2]Nipol 1502 made by Nippon Zeon
*[3]Diablack G made by Mitsubishi Chemical
*[4]Zinc White #3 made by Seido Chemical Industry
*[5]Beads Stearic Acid made by NOF Corporation
*[6]Extract #4S made by Showa Shell Sekiyu
*[7]Sunnoc made by Ouchi Shinko Chemical Industrial
*[8]Oil extended sulfur made by Hosoi Chemical Industry
*[9]Noccelar CZ-G made by Ouchi Shinko Chemical Industrial
*[10]Noccelar 224 made by Ouchi Shinko Chemical Industrial Conventional Examples 1 and 2

Pellets of the thermoplastic elastomer composition of Table I and the tackifier composition were used and a general-use two-layer T-die extrusion molding machine was used to form a laminate film and a laminate film of the thermoplastic elastomer composition and the tackifier composition was obtained. The thickness of this thermoplastic elastomer composition was 200 μm and the thickness of the tackifier composition was 50 μm. This film was used in the sheet shape for processing the tire.

Comparative Example 1

Pellets of the thermoplastic elastomer composition of Table I and the tackifier composition were used and a general-use two-layer inflation machine was used to form a laminate film by inflation molding and a laminate film of the thermoplastic elastomer composition and the tackifier composition was obtained. The thickness of the thermoplastic elastomer composition was 200 μm and the thickness of the tackifier composition was 50 μm. This cylindrical film was cut to a size appropriate for the tire width and used for processing a tire.

Comparative Example 2

Pellets of the thermoplastic elastomer composition in Table I and the tackifier composition were used and a general-use two-layer T-die extrusion molding machine was used to form a laminate film and a laminate film of the thermoplastic elastomer composition and the tackifier composition was obtained. The thickness of the thermoplastic elastomer composition was 200 μm and the thickness of the tackifier composition was 50 μm. This was cut to a width of 50 mm. On top of the tackifier layer of this film, a rubber compound having a thickness of 1 mm and a width of 40 mm was laminated as an elastomer layer so that both ends of the film were matched to thereby obtain a ribbon-shaped laminate.

Comparative Example 3

Pellets of the thermoplastic elastomer composition in Table I and the tackifier composition were used and a general-use two-layer T-die extrusion molding machine was used to form a laminate film and a laminate film of the thermoplastic elastomer composition and the tackifier composition was obtained. The thickness of the thermoplastic elastomer composition was 200 μm and the thickness of the tackifier composition was 50 μm. This was cut to a width of 50 mm to obtain a ribbon. This film is used as is without being laminated with an elastomer layer.

Preparation of Tire

Example 1

The air permeation preventive layer ribbon-shaped laminate of the above Example 1 was wound in a spiral shape around the outer circumferential surface of the tire processing drum (or an ordinary drum) using the part where no elastomer layer is laminated as the overlapping part and having an overlap width of 10 mm. On the top thereof, tire members were laid to form a green tire by an ordinary method. This green tire was vulcanized (conditions: 180° C.×10 min) to fabricate a tire size: 165SR13 (rim size: 13×41/2–J) pneumatic tire.

Example 2

The air permeation preventive layer ribbon-shaped laminate of the above Example 1 was wound in a spiral shape around the outer circumferential surface of the tire processing drum (or toroidal shape drum) using the part where no elastomer layer is laminated as the overlapping part and having an overlap width of 10 mm. On the top thereof, tire members were laid to form a green tire by an ordinary method. This green tire was vulcanized (conditions: 180° C.×10 min) to fabricate a tire size: 165SR13 (rim size: 13×41/2–J) pneumatic tire.

Conventional Example 1

The air permeation preventive layer sheet of the above Conventional Example 1 was wound around the tire processing drum (or ordinary drum) so that the thermoplastic elastomer composition became the drum side and the tackifier became the tire member side. On the top thereof, tire members were laid to form a green tire by an ordinary method. This green tire was vulcanized (conditions: 180° C.×10 min) to fabricate a tire size: 165SR13 (rim size: 13×41/2–J) pneumatic tire.

Conventional Example 2

The air permeation preventive layer sheet of the above Conventional Example 1 was wound around the tire processing drum (or toroidal shape drum) so that the thermoplastic elastomer composition became the drum side and the tackifier became the tire member side. On the top thereof, tire members were laid to form a green tire by an ordinary method. This green tire was vulcanized (conditions: 180° C.×10 min) to fabricate a tire size: 165SR13 (rim size: 13×41/2–J) pneumatic tire.

Comparative Example 1

The air permeation preventive layer film of the above Comparative Example 1 was laid on the tire processing drum (or ordinary drum) so that the thermoplastic elastomer composition became the drum side and the adhesive agent became the tire member side. On the top thereof, tire members were laid to form a green tire by an ordinary method. This green tire was vulcanized (conditions: 180° C.×10 min) to fabricate a tire size: 165SR13 (rim size: 13×41/2–J) pneumatic tire.

Comparative Examples 2 and 3

The air permeation preventive layer ribbon of the above Comparative Example 2 or 3 was wound in a spiral shape on the outer circumferential surface of the tire processing drum (Ordinary drum) having an overlap width of 10 mm. On the top thereof, tire members were laid to form a green tire by an ordinary method. This green tire was vulcanized (conditions: 180° C.×10 min) to fabricate a tire size: 165SR13 (rim size: 13×41/2–J) pneumatic tire. The evaluation results are shown in Table IV.

Method of Evaluation of Building Time

The time from the start of processing to the end of building when processing the tire is measured. Cases taking 10 seconds or more time compared with Conventional Example 1 was evaluated as "poor", cases taking 0 to 10 seconds compared with Conventional Example 1 as "good", and cases enabling the time to be shortened compared with the Conventional Example 1 as "superior".

Method of Evaluation of Production Defects

Cases where a vulcanized tire with spliced parts (or overlapped parts) of the air permeation preventive layer is opened and with the air permeation preventive locally stretched or wrinkled were evaluated as "poor", and cases where the air permeation preventive layer had none of these defects were evaluated as "superior".

Air Leakage Test Method (Rate of Decrease in Pressure)

The tires were allowed to stand under conditions of an initial pressure of 200 kPa and a room temperature of 21° C. at no load for three months. The internal pressure was measured at intervals of four days. This was regressed to a function of the measurement pressure $P_t$, initial pressure $P_o$ and days elapsed t $$(P_1/P_0) = \exp(-\alpha t)$$

to find the $\alpha$ value. The $\alpha$ thus obtained was used and t=30 was entered into the following equation:

$$\beta = [1 - \exp(-\alpha t)] \times 100$$

to obtain the $\beta$ value. This $\beta$ value was used as the rate of decrease in pressure per month (%/month).

1 which inserts a cylindrical film, the processing time can be greatly shortened. Furthermore, in Example 1, the overlapped part is comprised of resin film layers overlapped with each other, and, therefore, unlike Comparative Example 2 where the resin film layers and the rubber layers are overlapped, air leakage from the overlapped parts can be suppressed, whereby the air leakage is maintained low. Comparative Example 3 has the same production scheme as Example 1. However, when winding only the film, it is necessary to have a process for laying a separate elastomer layer on the top, thereby making Example 1, which winds this with an elastomer layer, shorter in the processing time. Further, while both Example 2 and Conventional Example 2 use the toroidal shape drum, Example 2, where the air permeation preventive layer can be molded to the drum, has no production defects, while Conventional Example 2, where the air permeation preventive layer cannot be molded to the drum, has wrinkles in the air permeation preventive layer.

INDUSTRIAL APPLICABILITY

As explained above, the pneumatic tire of the present invention is superior in the air permeation preventive property, has good processability, is not liable to have splice openings form in the air permeation preventive layer, and is capable of shortening the processing time. Further, when using the resin film air permeation preventive layer, even in processing using a processing drum having a complicated shape, there is no occurrence of production defects. With the method of production of the pneumatic tire of the present invention, a pneumatic tire having the above properties can be efficiently manufactured.

The invention claimed is:

1. A pneumatic tire comprising:
    an air permeation preventive layer formed by adhering a resin film having, as a main component, a thermoplastic resin to a tire inner wall surface,
    the resin film being laminated, as a narrow width slit film shape, with an elastomer having a narrower width than a width of the resin film, a resultant ribbon-shaped lami-

TABLE IV

|  | Ex. 1 | Ex. 2 | Conv. Ex. 1 | Conv. Ex. 2 | Comp. Ex. 1 | Comp. Ex. 2 | Comp. Ex. 3 |
|---|---|---|---|---|---|---|---|
| Air permeation preventive layer scheme | Resin and elastomer laminate Ribbon-shaped Overlapping resin layers | Resin and elastomer laminate Ribbon-shaped Overlapping resin layers | Resin film only Sheet shaped Spliced resin layers | Resin film only Sheet shaped Spliced resin layers | Resin film only Cylinder shaped | Resin and elastomer laminate Ribbon-shaped Overlapping resin layers | Resin film only Ribbon-shaped Overlapping resin layers |
| Processing drum | Ordinary drum | Toroidal drum | Ordinary drum | Toroidal drum | Ordinary drum | Ordinary drum | Ordinary drum |
| Processing time evaluation | Superior | Superior | Standard | Good | Poor | Superior | Poor |
| Production defect Evaluation | Superior | Superior | Poor, splice openings | Poor, wrinkles | Splice, none | Superior | Superior |
| Air leakage test | 2.5%/month | 2.5%/month | 2.5%/month | 2.5%/month | 2.5%/month | 3.5%/month | 2.5%/month |

Example 1, unlike Conventional Example 1, has no splices in the direction perpendicular to the stretch direction of the film, and, therefore, there is no splice opening problem. In Example 1, the ribbon can be quickly wound around the processing drum. In comparison with Comparative Example nate of said resin film and the elastomer having a lapping portion devoid of the elastomer along one longitudinal edge of the laminate, wherein the laminate is continuously and spirally wound in a tire circumferential direction so that the air permeation preventive layer has one section of the laminate overlapping an adjacent section of the laminate at the lapping portion of the one section.

2. A pneumatic tire as claimed in claim 1, wherein the resin film has a thickness of 0.0001 to 1.1 mm.

3. A pneumatic tire as claimed in claim 1, wherein said resin film has a width of 5 to 100 mm.

4. A pneumatic tire as claimed in claim 1, wherein an elastomer layer laminated on the resin film in the laminate of the resin film and elastomer has a thickness of 0.01 to 5 mm.

5. A pneumatic tire as claimed in claim 1, wherein an elastomer layer laminated on the resin film in the laminate of the resin film and elastomer has a width of 50% to less than 100% of the resin film width.

6. A pneumatic tire as claimed in claim 1, wherein said thermoplastic resin is at least one member selected from the group consisting of polyamide-based resins, polyester-based resins, polynitrile-based resins, polymethacrylate-based resins, polyvinyl acetate-based resins, polyvinyl alcohol-based resins, polyvinyl chloride-based resins, cellulose-based resins, fluorine-based resins and imide-based resins.

7. A pneumatic tire as claimed in claim 1, wherein the elastomer laminated on the resin film is at least one member selected from the group consisting of diene-based rubbers, olefin-based rubbers and thermoplastic elastomers.

8. A pneumatic tire as claimed in claim 1, wherein the resin film contains at least one elastomer.

9. A pneumatic tire as claimed in claim 1, wherein the elastomer according to claim 8 is at least one member selected from the group consisting of diene-based rubbers, olefin-based rubbers, sulfur-containing rubbers, fluororubbers and thermoplastic elastomers.

10. A method for producing a pneumatic tire comprising:
making a resin film containing a thermoplastic resin, as a main component thereof, into a narrow width slit shaped film,
laminating an elastomer having a narrower width than a width of the resin film with the resultant narrow width slit shaped film to obtain a ribbon-shaped laminate, a resultant ribbon-shaped laminate of said resin film and the elastomer having a lapping portion devoid of the elastomer along one longitudinal edge of the laminate,
continuously winding the resultant ribbon-shaped laminate in a spiral shape at an outer circumferential surface of a tire processing drum so as to form an air permeation preventive layer, the air permeating preventive layer having one section of the laminate overlapping an adjacent section of the laminate at the lapping portion of the one section,
placing other tire component members on the air permeation preventive layer to form a green tire,
then vulcanizing the resultant green tire.

* * * * *